Jan. 13, 1959
V. CARLSEN
2,869,008
INDUCTION MOTOR ARMATURE CONTROL
Filed May 8, 1957
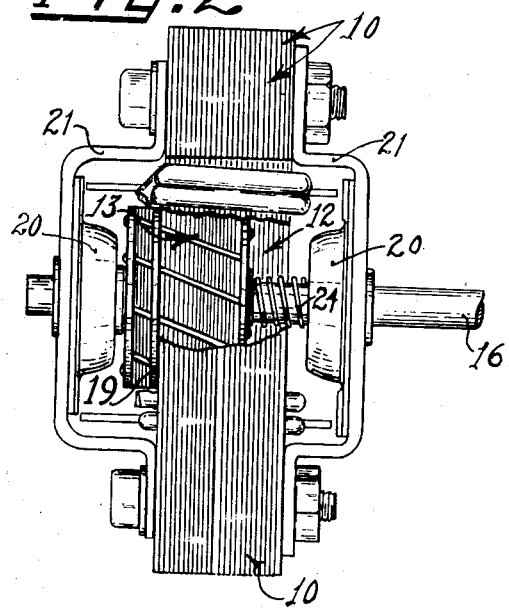
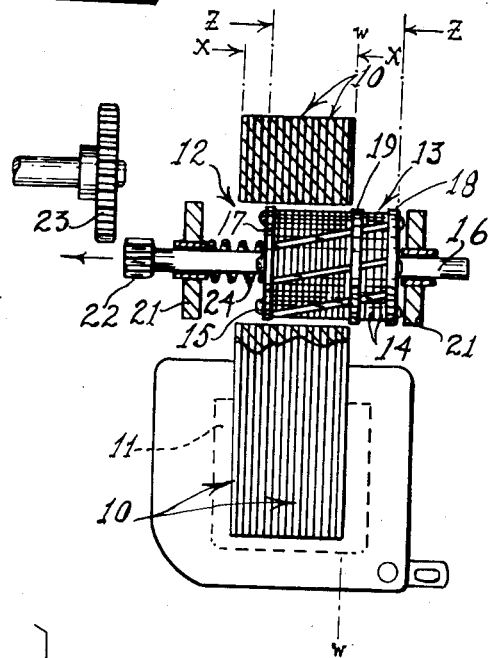
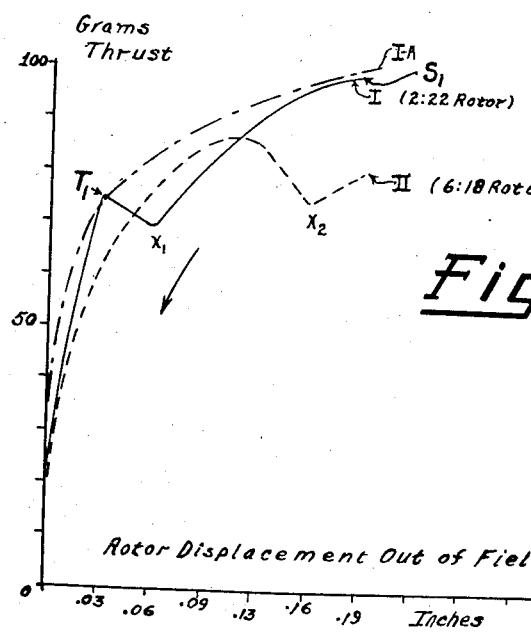
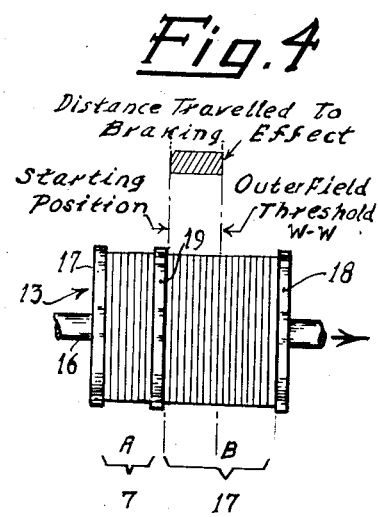
INVENTOR.
BY Victor Carlsen United States Patent Office 2,869,008
Patented Jan. 13, 1959

2,869,008

INDUCTION MOTOR ARMATURE CONTROL

Victor Carlsen, Chicago, Ill., assignor to Molon Motors and Coil Corporation, Chicago, Ill., a corporation of Illinois Application May 8, 1957, Serial No. 657,813

6 Claims. (Cl. 310—209)

The invention has as its object the provision of improvements in electric induction motors having shiftable armatures (rotors) of the squirrel-cage variety utilized in conjunction with clutch means or gears to procure automatic coupling and uncoupling with the driven load responsive to connection and disconnection of power to the motor.

In one well-known type of fractional horsepower motor, for example, the rotor shaft is provided with a so-called gear clutch consisting of a pinion adapted to mesh with a driven gear when the motor is started. The solenoid effect produced in the stator field attracts the rotor, which tends to be strongly pulled back into the field instantly upon connection of power to the motor winding.

In such constructions the armature or rotor is free to shift axially and some form of spring means normally urges the same, when at rest, partially out of the field core; but as soon as the current is applied the rotor pulls back into the field and at the same time begins to rotate.

When these so-called gear clutches are used, trouble arises ultimately from wear on the pinions owing to a peculiarity of the solenoid action which causes the pinion to clash into mesh with its driven pinion whenever the motor is started. The rotor pinions soon become chewed because the rotor acts in the manner of the plunger of a conventional solenoid and accelerates as it enters the rising field flux, although the pull on the rotor falls sharply as it nears the end of its stroke.

In small motors the damage appears only gradually because the small rotor usually will start turning as it enters the field and this aids the intermesh somewhat, although the rotor ordinarily is not up to full speed at the moment of first contact of the pinion with its gear. However, the damage is cumulative as well as certain, and numerous attempts have been made from time to time to overcome this difficulty.

According to the present invention, the solenoid effect of a rotor in an induction motor of the squirrel-cage type is selectively controlled to cushion the thrust of the rotor at exactly a desired point in its inward travel.

Such control and cushioning of the solenoid action is achieved by short-circuiting a portion of the induced rotor flux at a selected point axially along the rotor, whereby to slow up or cushion the axial shift at a desired point without at the same time interfering materially with the development of the starting torque.

The invention further contemplates the selective positioning of the rotor in its field by locating induction rings at critical positions along the rotor axis and proportioning the axial length of the rotor in relation to the axial depth of the stator field bore into which the rotor will move and seek its working position, so that a given rotor can be made automatically self-adjusting to ride or work fully or only partially in the field bore at some desired position.

Other aspects of novelty and utility characterizing the invention relate to details of the construction and operation of the embodiment described hereinafter in view of the accompanying drawing, in which:

Fig. 1 is a schematic view showing in partial vertical section the elements of a squirrel-cage motor with gear clutch;

Fig. 2 is a top view of a fractional horse power motor with portions of the stator cut away to expose the rotor;

Fig. 3 is a comparative graph depicting the positions of braking effects for different rotors;

Fig. 4 is a diagrammatic representation of certain rotor characteristics.

The motor shown in Fig. 1 employs a conventional stator frame consisting of an assembly of field laminations 10 provided with an energizing winding 11 and a field bore 12 in which a rotor 13 works.

The rotor comprises the usual squirrel-cage laminations 14 secured together by headed inductor rods 15 and fixed on a shaft 16. The rods or pins 15 are usually of copper and their opposite ends are fixed in copper shorting rings 17 and 18, by means of which the copper inductor rods are connected in a closed induction circuit.

The induced alternating flux set up by the field poles of the stator assembly induces reactive currents in the inductor rods 15 which provide the torque generated in the rotor, all in the manner well-known in the art.

The rotor shaft 16 is journaled in bearing means 20 (see also Fig. 2) carried by brackets 21 bolted to the stator frame, and one end of the shaft is provided with a pinion 22 (Fig. 1) adapted to mesh with a driven gear 23.

The bearings are spaced to permit the rotor to shift a substantial amount along its axis so as to move the pinion 22 into and out of mesh with gear 23; and a throw-out spring 24 is provided to urge the rotor axially to a normal position of rest partly out of the bore and with the pinion and gear clutch means 22, 23 disengaged, as in Fig. 1.

The construction thus far described is not new. However, the rotor 13, as shown, is new and differs from others in the respect that it is provided with at least one extra shorting ring 19 which will generally be located at one side of the center of mass of the rotor proper.

In the conventional rotor of the type as heretofore made, the center of mass and the magnetic center may be said to coincide substantially, and the rotor will tend to ride in a main field in which the working flux distribution is substantially symmetrical with respect to such center of mass when the armature is running fully in said main field.

However, the extra shorting or control ring when located off center, that is at one side of the magnetic center along the rotative axis, upsets the flux symmetry and causes the armature automatically to assume a different running position in the field from that which it would otherwise occupy in the absence of the extra and unsymmetrically-located control ring 19.

For purposes of description, those rotors which are provided with control rings 19 at other than symmetrical or centered locations (i. e. symmetrically of the axial ends of the armature or rotor, and hence approximately of the magnetic center) are called asymmetric to distinguish from rotors in which an extra ring may be located centrally for a symmetrical field.

The ordinary rotor without control rings and also the new rotor equipped with a symmetrical or centrally-located ring will each tend to center itself in the working field and to ride symmetrically therein, and this holds true even when the rotor is axially longer than the bore or the bore is longer than the rotor, assuming otherwise uniform construction of both rotor and stator and assuming at all times that the rotor has sufficient freedom to shift axially to whatever running position it may seek, and that it is also free from extraneous influences which would otherwise prevent such shifting.

In this connection, for instance, it may be noted that the spring means 24 for gear-clutch purposes is just strong enough to push the armature out of the field bore to disengage the gears when the current is shut off, but is not strong enough to interfere objectionably with the axial shifting of the rotor in its solenoid action in returning into the field.

It is to be understood therefore that in a construction such as shown schematically in Fig. 1 the depth or length of the field bore between lines X—X can be less than, or greater than, the axial length of the rotor as measured e. g. between lines Z—Z, and vice versa.

Whether the rotor rides fully or partially in the main working field depends upon the symmetric or asymmetric location of the control ring with respect to the mass center of the rotor and magnetic centers of the stator and rotor.

The constructions represented in Figs. 1, 2, and 3 represent the condition in which the rotors have one asymmetric control ring in a stator and rotor combination of equal pole-face length in the axial direction, that is to say, that the length of the rotor 13 substantially equals the length of the stator field bore 12, which is the distance between lines X—X in Fig. 1.

In general, the location of the braking or cushioning rings along the axial length of the rotor determines the position along the shifting axis at which the effect will occur.

The precise placement of these rings to produce the effect at a desired point is best determined empirically because of numerous variables in design factors for a given motor specification, including such things as the gap dimensions, magnetic insulation, thickness of laminations and rings and properties thereof, slippage, the character of the actual working and leakage fluxes, and the characteristics of the throw-out spring.

An initial approximation for locating a ring in a given case may be had by taking the distance between the entering end of the driving pinion (at rest) and the point of approach to the driven gear at which the first braking effect is desired, and locating the ring approximately the same distance outwardly away from limit W—W of the working field on the farther side.

In the graph of Fig. 3 the cushioning effect is illustrated by the full-line pull-in curve I for a small fractional-horsepower motor having a 24-lamination rotor with one cushioning ring located at the 2:22 position, meaning 2 laminations from the trailing end and 22 laminations from the leading or entering end of the rotor, the field bore of the stator being approximately of the same depth as the length of the rotor so that the latter when running fully in the field has its two ends substantially flush into the bore.

Oversize bores and undersize rotors, as to axial length, produce modified effects which follow the general principles heretofore alluded to. At starting position, the aforesaid rotor per curve I was approximately 5/32" out of the field bore, and the axial thrust on the shaft was measured and plotted at intervals of 1/32".

The maximum pull on the armature existed at the time of its no-load starting at the point $S_1$ on the graph, and by the time the rotor (and more particularly the braking ring) had moved axially toward the field only 4/32", the thrust curve dropped abruptly at the point $X_1$ and thereafter briefly climbed back to the level $T_1$ before falling off steeply to zero as the rotor came up to running speed fully pulled into the field.

The broken-line curve II in Fig. 3 illustrates the shifting of the cushion effect for a different (6:18) rotor to the point $X_2$ which is located considerably closer to the starting portions of the curve and was produced by locating the control ring at the 6:18 position, meaning again that it was 6 laminations away from the trailing end of the rotor and 18 laminations away from the leading or entering end thereof.

The curve at I—A in the dash-dot lines shows the thrust curve for the 2:22 rotor (curve I) when the same is reversed end to end so that the control ring is only 2 laminations away from the leading end of the rotor and is therefor not only already well into the field, but is advanced considerably past the magnetic center thereof, so that the thrust effect is undetected as a practical matter and does not appear in the curve I—A. Substantially the identical curve I—A would result from a rotor of the same dimensions having no control ring at all.

In Fig. 1 the line W—W represents an ideal outer limit of the main flux or field beyond which inductive effects on the rotor can be ignored. Actually the zone of effective flux in this region will vary with the design of the motor, and even from one motor to another of the same design. But always there is an outer limit to the zone of effective stray and field flux, and the line W—W is adopted as the limit arbitrarily. This line marks an imaginary entering threshold.

For purposes of description, any portion of the rotor lying outside of line W—W may be said to lie outside of the effective limit of the main field.

The end rings or shorting rings 13 are usually of copper and electrically connected to the copper inductor pins or rods 15 by reason of close fit therewith as well as the heading of said rods or pins, and in the usual constructions, also by being dipped in a solder bath.

The control rings 19 are likewise traversed by, and connected to, the inductor rods by tight fit therewith, but such rings may be made of brass or a conductive material having higher resistivity than copper or brass in order to adjust the control effect by making the braking action less pronounced owing to induction of a lesser counter-electromotive force. Thus, the location at which the effect is to occur may be determined as approximately the distance outwardly between the control ring and the effective field zone; and the magnitude of the effect may be adjusted by predetermining the conductivity of the control ring.

In Fig. 4 the distance between the line W—W and the relative "starting position" of the control ring 19 approximates the distance to be travelled by the rotor on starting, before the braking effect occurs. This diagram represents a 7—17 rotor in which the control ring 19 is located between groups A and B of laminations in which the first group contains 7 laminae and group B contains 17 laminae, making up a 24-lamination rotor.

I claim:

1. In a squirrel-cage type motor having an axially shiftable laminated rotor with inductive conductors and endwise shorting rings therefor adapted to be pulled into a full working field by solenoid action, control means for slowing up the inward rotor displacement at a desired point of travel and comprising the placement of a conductive shorting ring for said conductors in the assembly of rotor laminations at one side of the approximate magnetic center thereof with respect to the opposite axial ends of the rotor, and at a distance from the stator field on the entering side which approximately equals the amount of inward solenoid travel which the rotor shall make to the instant the retarding effect of the control ring shall appear as said ring effectively enters said field.

2. In an electric induction motor having a magnetically attractable rotor with induction conductors and mounted to shift axially by solenoid action inwardly and outwardly of an electromagnetic working field and bore with means normally urging the rotor to a predetermined starting position outwardly of said bore, control means for cushioning the inward rotor movement on starting energization of the motor, said control means comprising a non-magnetic short-circuiting inductor means in said rotor connected with said conductors to short-circuit portions of induced currents therein and located at a position along the rotative axis thereof which is outside of said field when the rotor is in said starting position and which is at a distance from the threshold of said field substantially equal to the desired amount of inward travel which shall be permitted the rotor before the cushioning effect occurs, such that the short-circuiting action of said inductor means becomes effective substantially upon entry thereof into said threshold in solenoid action of the rotor as aforesaid.

3. In a squirrel-cage type induction motor, an axially-shiftable induction rotor and means normally shifting the same to an inactive position a predetermined distance out of the working field with a force permitting the solenoid action of the field when the motor is energized to pull the rotor back into the field to running position, and control means for resisting the inward solenoid pull at a certain position along the inward displacement of the rotor, said control means comprising an electro-conductive member disposed in said rotor at a certain position between the axial ends thereof, said position being such that in said starting position the conductive member lies outwardly beyond the threshhold of the working field toward which the rotor is pulled by solenoid action by a distance which is the same as the inward distance the rotor must travel until said conductive member can meet said threshold sufficiently to short-circuit some of the induced electromotive force in the rotor and modify the inward solenoid attraction on the rotor to cushion the inward movement of the rotor momentarily, at least.

4. In a squirrel-cage type motor, a stator having a rotor bore of predetermined axial length, and an energizing winding for said stator; an induction rotor having squirrel-cage inductor means of predetermined axial length adapted to ride in a working position in the working field in the stator bore; said working field having an effective outside limit and threshold near at least one end of said bore; bearing means for the rotor and permitting axial displacement of the latter a predetermined distance outwardly of said bore beyond said limiting threshold when the winding is substantially deenergized, said rotor being pulled back into the bore to said running position by solenoidal action on effective energization of the stator winding; and control means for cushioning the inward solenoid displacement of the rotor and comprising a conductive ring located in the rotor between the axial ends thereof and electrically short-circuiting the squirrel-cage inductor means of said rotor and located outwardly beyond said threshold when said rotor is in said starting position, and producing an arresting effect on the inward solenoid travel of the rotor substantially at the point of inward solenoid travel thereof at which said conductive ring enters the working field at said threshold, together with spring means normally displacing the rotor outwardly when the winding is deenergized as aforesaid.

5. A rotor for an induction motor of the type in which the rotor is spring-shifted axially a substantial distance out of the working field when the motor is not energized, and the rotor is magnetically attracted back into running position in said field when energized, said rotor comprising: a stack of ferro-magnetic laminations on a rotor shaft; a plurality of conductive rods extending axially from end to end through said laminations concentrically of the latter and said shaft; a conductive shorting ring at each end of said stack and each ring conductively engaging the end regions of the said rods at the appertaining end of the rotor; and at least one electro-conductive control ring disposed in said stack axially at one side of the center thereof and having electro-conductive connection with said rods, said control ring being effective to exert a retarding upon the axial shifting of the rotor into said field beginning upon entry of said control ring substantially into said field.

6. In an induction motor of the squirrel-cage variety having an energizing winding and field stator with a rotor bore of given axial length, and a squirrel-cage inductive rotor of given length mounted to rotate in said bore and to shift axially a substantial distance from a non-running position with substantial portions thereof axially displaced outside of said bore, to a running position with said outside portions substantially in said bore as a result of magnetic attraction into the bore when said winding is energized, said rotor inducing reactive, torque-producing currents from the stator field, improvements comprising, namely: the provision of conductive control means on said rotor located at one side of the magnetic center along the rotative axis thereof so as to lie a substantial distance beyond the magnetic center of said bore in said outward direction and condition of displacement of the rotor, whereby to momentarily reduce the force of the inward axial movement of the rotor on magnetic attraction as aforesaid by short-circuiting some of said induced current in the rotor at a particular location along the axial extent thereof corresponding to the location of said conductive means.

References Cited in the file of this patent

UNITED STATES PATENTS

| 2,047,831 | Lund | July 14, 1936 |
| 2,195,219 | McGoldrick | Mar. 26, 1940 |